United States Patent
Kim

(10) Patent No.: US 9,311,680 B2
(45) Date of Patent: Apr. 12, 2016

(54) APPARATUS AND METHOD FOR GENERATING EMOTION INFORMATION, AND FUNCTION RECOMMENDATION APPARATUS BASED ON EMOTION INFORMATION

(75) Inventor: Hyun-Jun Kim, Osan-si (KR)

(73) Assignee: Samsung Electronis Co., Ltd., Suwon-si (KR)

( * ) Notice: Subject to any disclaimer, the term of this patent is extended or adjusted under 35 U.S.C. 154(b) by 1134 days.

(21) Appl. No.: 13/345,401

(22) Filed: Jan. 6, 2012

(65) Prior Publication Data

US 2013/0030812 A1    Jan. 31, 2013

(30) Foreign Application Priority Data

Jul. 29, 2011 (KR) .................. 10-2011-0076112

(51) Int. Cl.
| | |
|---|---|
| G10L 15/22 | (2006.01) |
| G10L 25/63 | (2013.01) |
| G06Q 10/06 | (2012.01) |
| G06Q 50/00 | (2012.01) |

(52) U.S. Cl.
CPC .............. *G06Q 50/01* (2013.01); *G10L 15/22* (2013.01); *G06F 2203/011* (2013.01); *G06Q 10/06375* (2013.01); *G10L 25/63* (2013.01)

(58) Field of Classification Search
CPC .......... G10L 25/00; G10L 15/22; G10L 25/63
See application file for complete search history.

(56) References Cited

U.S. PATENT DOCUMENTS

| | | | | | |
|---|---|---|---|---|---|
| 3,727,604 | A | * | 4/1973 | Sidwell et al. | 600/372 |
| 5,029,214 | A | * | 7/1991 | Hollander | 704/272 |
| 5,720,619 | A | * | 2/1998 | Fisslinger | 434/336 |
| 5,918,222 | A | * | 6/1999 | Fukui et al. | |
| 6,072,467 | A | * | 6/2000 | Walker | 345/157 |
| 6,263,326 | B1 | * | 7/2001 | Chandra | 706/21 |
| 6,452,348 | B1 | * | 9/2002 | Toyoda | 318/3 |
| 6,594,649 | B2 | * | 7/2003 | Sadakuni | 706/14 |
| 6,658,388 | B1 | * | 12/2003 | Kleindienst et al. | 704/275 |
| 6,721,706 | B1 | * | 4/2004 | Strubbe et al. | 704/275 |
| 7,007,235 | B1 | * | 2/2006 | Hussein et al. | 715/751 |
| 7,065,490 | B1 | * | 6/2006 | Asano et al. | 704/275 |
| 7,912,720 | B1 | * | 3/2011 | Hakkani-Tur et al. | 704/270 |
| 7,921,036 | B1 | * | 4/2011 | Sharma et al. | 705/14.66 |
| 8,130,935 | B1 | * | 3/2012 | Coughlan et al. | 379/265.07 |
| 8,433,612 | B1 | * | 4/2013 | Sharma et al. | 705/14.41 |
| 2002/0135618 | A1 | * | 9/2002 | Maes et al. | 345/767 |
| 2003/0154076 | A1 | * | 8/2003 | Kemp | 704/236 |
| 2005/0033660 | A1 | * | 2/2005 | Solomon | 705/26 |
| 2005/0102135 | A1 | * | 5/2005 | Goronzy et al. | 704/213 |
| 2006/0122834 | A1 | * | 6/2006 | Bennett | 704/256 |
| 2006/0167694 | A1 | * | 7/2006 | Mitsuyoshi | 704/270 |
| 2006/0203992 | A1 | * | 9/2006 | Kim | 379/265.06 |

(Continued)

FOREIGN PATENT DOCUMENTS

| | | |
|---|---|---|
| JP | 2007-202063 | 8/2007 |
| KR | 10-2006-0075704 A | 7/2006 |

(Continued)

*Primary Examiner* — Eric Yen
(74) *Attorney, Agent, or Firm* — NSIP Law

(57) ABSTRACT

Provided is an emotion information generating apparatus that is capable of recognizing a user's emotional state for each function of a terminal. The emotion information generating apparatus detects a user's emotional state and maps the user's emotional state to a function of the terminal, thus creating emotion information.

24 Claims, 10 Drawing Sheets

(56) References Cited

U.S. PATENT DOCUMENTS

| | | | |
|---|---|---|---|
| 2007/0143127 A1* | 6/2007 | Dodd et al. | 705/1 |
| 2007/0208569 A1* | 9/2007 | Subramanian et al. | 704/270 |
| 2007/0223871 A1 | 9/2007 | Thelen | |
| 2008/0177540 A1* | 7/2008 | Stewart et al. | 704/249 |
| 2009/0103709 A1* | 4/2009 | Conway et al. | 379/265.09 |
| 2009/0228272 A1* | 9/2009 | Herbig et al. | 704/233 |
| 2009/0228479 A1* | 9/2009 | Nishiyama | 707/5 |
| 2009/0248372 A1 | 10/2009 | Ryu et al. | |
| 2009/0270170 A1* | 10/2009 | Patton | 463/36 |
| 2009/0313019 A1* | 12/2009 | Kato et al. | 704/254 |
| 2010/0060461 A1* | 3/2010 | Sprague | 340/573.1 |
| 2010/0185444 A1* | 7/2010 | Olsen | 704/246 |
| 2010/0211397 A1* | 8/2010 | Park et al. | 704/276 |
| 2010/0302254 A1* | 12/2010 | Min et al. | 345/473 |
| 2011/0043635 A1* | 2/2011 | Fujita et al. | 348/149 |
| 2011/0105857 A1* | 5/2011 | Zhang et al. | 600/300 |
| 2011/0106536 A1* | 5/2011 | Klappert | 704/246 |
| 2011/0145040 A1* | 6/2011 | Zahn et al. | 705/7.33 |
| 2011/0172992 A1* | 7/2011 | Shin et al. | 704/201 |
| 2011/0196677 A1* | 8/2011 | Deshmukh et al. | 704/246 |
| 2011/0295607 A1* | 12/2011 | Krishnan et al. | 704/270 |
| 2012/0002848 A1* | 1/2012 | Hill | 382/118 |
| 2012/0004511 A1* | 1/2012 | Sivadas | 600/300 |
| 2012/0047447 A1* | 2/2012 | Haq | 715/752 |
| 2012/0191338 A1* | 7/2012 | French et al. | 701/400 |
| 2012/0296642 A1* | 11/2012 | Shammass et al. | 704/211 |

FOREIGN PATENT DOCUMENTS

| | | |
|---|---|---|
| KR | 10-2006-0131981 | 12/2006 |
| KR | 10-2009-0017149 A | 2/2009 |
| KR | 10-2009-0083729 | 8/2009 |
| KR | 10-2009-0102106 | 9/2009 |

* cited by examiner

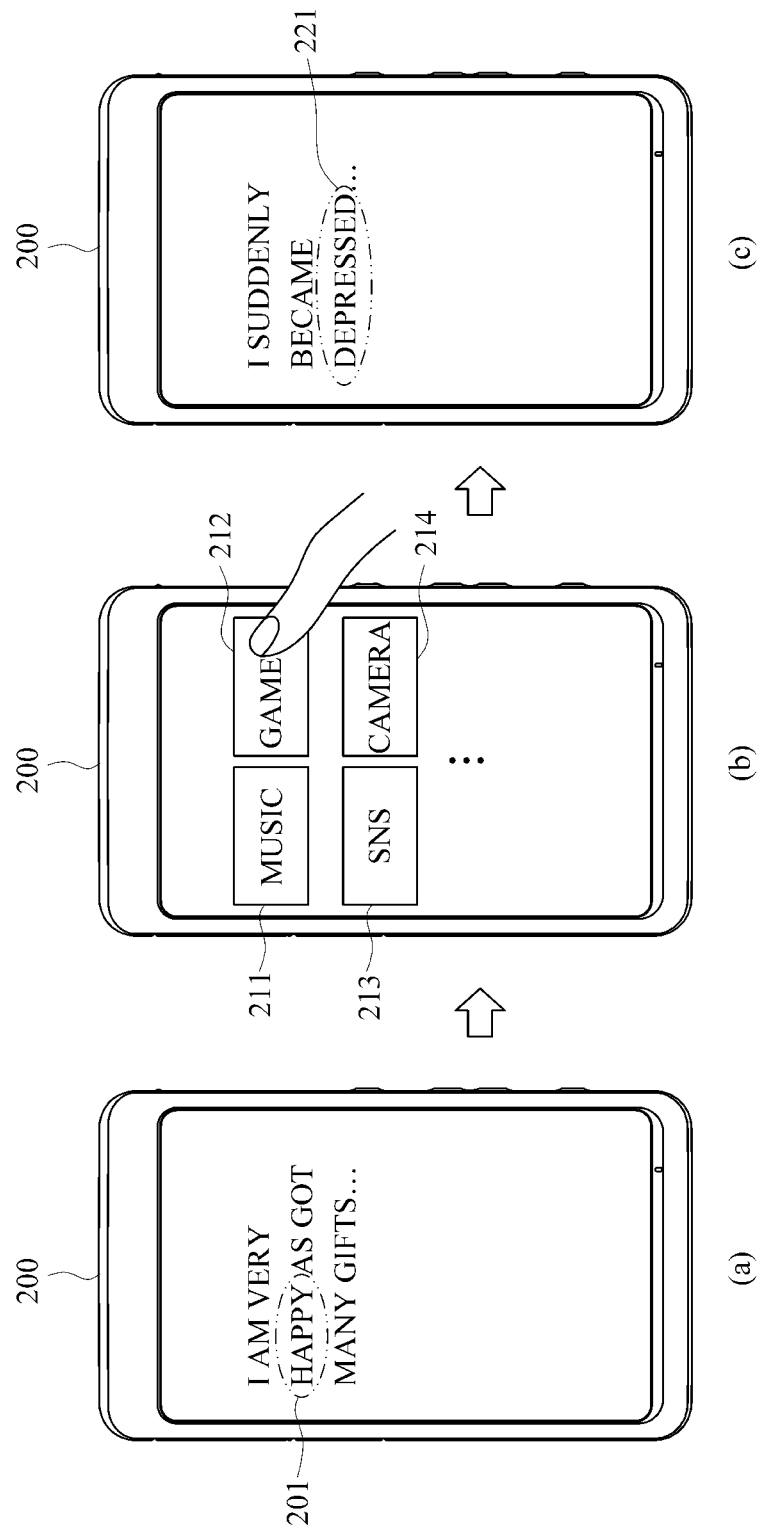

FIG. 2B

| WHEN \ FUNCTION | GAME | MUSIC | CAMERA | ... |
|---|---|---|---|---|
| BEFORE EXECUTION | HAPPINESS | HAPPINESS | DEPRESSION | ... |
| AFTER EXECUTION | DEPRESSION | EXCITEMENT | HAPPINESS | ... |

230

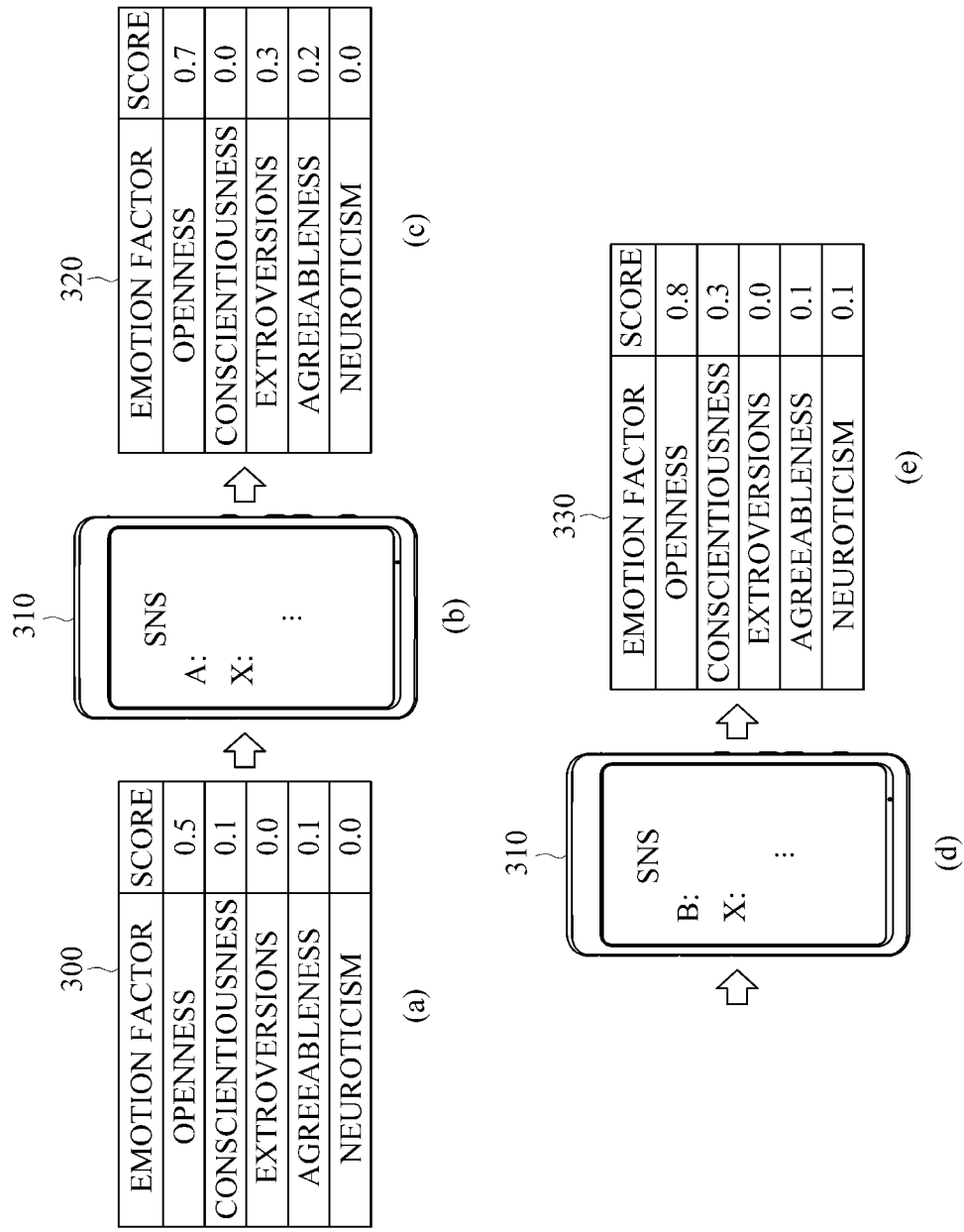

FIG. 3B

| FUNCTION<br>EMOTION FACTOR | SNS | ... |
|---|---|---|
| OPENNESS | +0.3 | ... |
| CONSCIENTIOUSNESS | +0.2 | ... |
| EXTROVERSIONS | 0.0 | ... |
| AGREEABLENESS | 0.0 | ... |
| NEUROTICISM | +0.1 | ... |

| FUNCTION<br>EMOTION FACTOR | A | B | ... |
|---|---|---|---|
| OPENNESS | +0.2 | +0.1 | ... |
| CONSCIENTIOUSNESS | -0.1 | +0.3 | ... |
| EXTROVERSIONS | +0.3 | -0.3 | ... |
| AGREEABLENESS | +0.1 | -0.1 | ... |
| NEUROTICISM | 0.0 | +0.1 | ... |

| WHEN＼FUNCTION | GAME | MUSIC | CAMERA | ... |
|---|---|---|---|---|
| BEFORE EXECUTION | HAPPINESS | HAPPINESS | DEPRESSION | ... |
| AFTER EXECUTION | DEPRESSION | EXCITEMENT | HAPPINESS | ... |

APPARATUS AND METHOD FOR GENERATING EMOTION INFORMATION, AND FUNCTION RECOMMENDATION APPARATUS BASED ON EMOTION INFORMATION

CROSS-REFERENCE TO RELATED APPLICATION(S)

This application claims the benefit under 35 U.S.C. §119 (a) of Korean Patent Application No. 10-2011-0076112, filed on Jul. 29, 2011, in the Korean Intellectual Property Office, the entire disclosure of which is incorporated herein by reference for all purposes.

BACKGROUND

1. Field

The following description relates to a technique for recognizing emotion information of a user and providing the user with information based on the recognized emotion.

2. Description of the Related Art

Various terminals that are capable of performing various functions, such as a call function, a camera function, a camcorder function, an Internet access function, financial transactions, etc., are currently being manufactured and sold. The terminals may include various sensors.

For example, a terminal may include a touch sensor for sensing the way a user touches a display, a proximity sensor for sensing objects in the proximity of the terminal, a GPS sensor for sensing a location of the terminal, a Gyro sensor for sensing acceleration/deceleration of the terminal, and the like.

The sensed information may be used to provide information about a user of the terminal.

SUMMARY

In one general aspect, there is provided an emotion information generating apparatus including a function detector configured to detect a function execution state of a terminal, an emotion detector configured to detect an emotional state of a user of the terminal based on information about a use state of the terminal, and a mapping unit configured to map the user's emotional state to at least one of the function of the terminal and information included in the function of the terminal, based on the function execution state.

The emotion detector may be configured to compare the user's emotional state before the function is executed with the user's emotional state after the function is executed, to detect a change in the user's emotion state.

The emotion detector may be configured to score a plurality of emotion factors of an emotional model to create a plurality of emotion scores, and to detect the user's emotional state based on the emotion scores.

The emotion detector may be configured to compare the user's emotion scores before the function is executed with the user's emotion scores after the function is executed, to score a change in the user's emotion scores.

The mapping unit may be configured to map the change in the user's emotion scores to the function, and create a table, a matrix, or a vector, including the function and the change in emotion scores mapped to the function.

The mapping unit may be configured to extract a function that is currently being executed or that was previously executed, based on the function execution state, and map the user's emotional state to the extracted function.

The emotion detector may be configured to detect the user's emotional state with a stochastic score.

The function execution state of the terminal may comprise at least one of information about an execution start time of the function, an execution termination time of the function, and whether or not the function is currently being executed.

In another aspect, there is provided a function recommendation apparatus based on emotion information, the function recommendation apparatus including an emotion information generating unit configured to map an emotional state of a user of a terminal to at least one of a function of the terminal and information included in the function, and a recommendation unit configured to recommend at least one function to the user based on the results of the mapping.

The emotion information generating unit may comprise a function detector configured to detect a function execution state of the terminal, an emotion detector configured to detect the emotional state of the user of the terminal based on information about a use state of the terminal, and a mapping unit configured to map the user's emotional state to at least one of the function of the terminal and the information included in the function of the terminal, based on the function execution state.

The function execution state of the terminal may comprise at least one of information about an execution start time of the function, an execution termination time of the function, and whether or not the function is currently being executed.

The emotion generating unit may be configured to compare the user's emotional state before the function is executed with the user's emotional state after the function is executed, to detect a change in the user's emotional state.

The emotion generating unit may be configured to score a plurality of emotion factors of an emotional model based on the information about the use state of the terminal, to create a plurality of emotion scores, and to detect the user's emotion state based on the emotion scores.

The emotion generating unit may be configured to compare the user's emotion scores before the function is executed with the user's emotion scores after the function is executed, and to score a change in the user's emotion scores.

The recommendation unit may be configured to recommend at least one function to the user through an output unit.

The emotion generating unit may be configured to detect the user's emotional state with a stochastic score.

In another aspect, there is provided an emotion information generating method including detecting a function execution state of a terminal, detecting an emotional state of a user of the terminal based on information about a use state of the terminal, and mapping the user's emotional state to at least one of the function of the terminal and information included in the function of the terminal, based on the function execution state.

The detecting of the user's emotional state may comprise comparing the user's emotional state before the function is executed with the user's emotional state after the function is executed, and detecting a change in the user's emotional state.

The detecting of the user's emotional state may comprise scoring a plurality of emotion factors of an emotional model based on information about a use state of the terminal, to create a plurality of emotion scores, and detecting the user's emotional state based on the emotion scores.

The detecting of the user's emotional state may comprise comparing the user's emotional scores before the function is executed with the user's emotional scores after the function is executed, and scoring a change in the user's emotional scores.

The mapping of the user's emotional state may comprise mapping the change in the user's emotion scores to the function, and creating a table, a matrix, or a vector, including the function and the change in emotion scores mapped to the function.

The mapping of the user's emotional state may comprise extracting a function that is currently executed or that was previously executed, based on the function execution state, and mapping the user's emotional state to the extracted function.

The detecting of the user's emotional state may comprise detecting the user's emotional state with a stochastic score.

The function execution state of the terminal may comprise at least one of information about an execution start time of the function, an execution termination time of the function, and whether or not the function is currently being executed.

Other features and aspects may be apparent from the following detailed description, the drawings, and the claims.

BRIEF DESCRIPTION OF THE DRAWINGS

FIGS. 2A and 2B are diagrams illustrating an example of a process of mapping a user's emotional state to a function.

FIGS. 3A, 3B, and 3C are diagrams illustrating another example of a process of mapping a user's emotional state to a function.

FIGS. 5A and 5B are diagrams illustrating an example of a process of recommending a function to a user.

Figure 1:
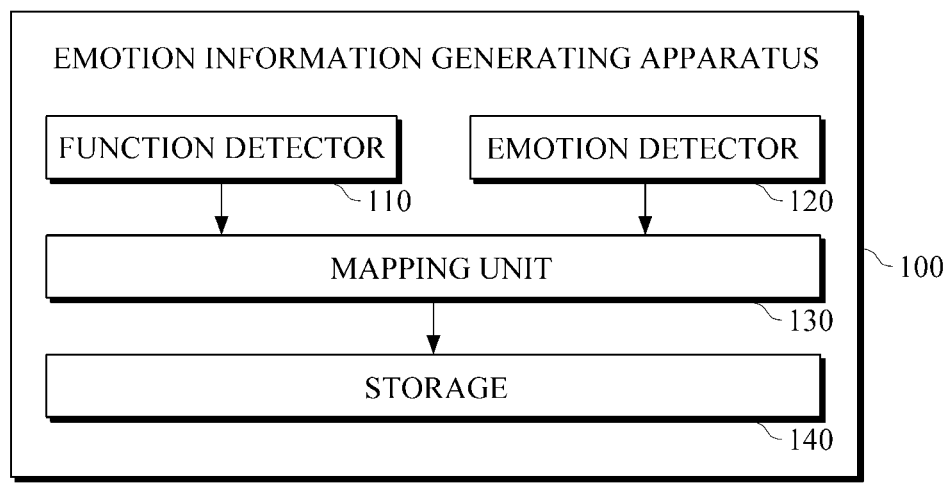
FIG. 1 is a diagram illustrating an example of an emotion information generating apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an emotion information generating apparatus.

Referring to FIG. 1, emotion information generating apparatus 100 includes a function detector 110, an emotion detector 120, a mapping unit 130, and a storage unit 140. The emotion information generating apparatus 100 may be included in a terminal.

The function detector 110 may detect a function execution state of a terminal. For example, the function may be a call function, a camera function, an Internet access function, a phone book function, functions for executing various applications, and the like, which can be executed by the terminal.

A function may include various information. For example, a social network service (SNS) function may include information about collocutors, and a music play function may include information about genres, singers, and the like. A user may execute various applications, such as games, music, a SNS, and the like, through the terminal.

The function execution state may include, for example, information about an execution start time of the corresponding function, an execution termination time of the function, whether or not the function is being currently executed, a kind of the function, and the like. For example, the function execution state may include information indicating that a function A has been executed within the last 10 seconds and is being currently executed, a function B has been executed within the last 1 minute and terminated before 20 seconds, and a function C has been executed within the last 3 minutes and terminated before 5 seconds.

The emotion detector 120 may detect the emotional state of a user of the terminal based on information about the use state of a terminal. For example, information about the use state of the terminal may include information about whether or not the user touches a display, the number of times that the user shakes the terminal, a degree of strength at which the user shakes the terminal, the number of times that the user clicks a specific icon or presses a specific keypad, and information from which the user's emotional state can be recognized, such as context information included in messages (SMS, MMS, etc.), mails, schedules, diary, memo notes, etc.

In various examples, the emotion detector 120 may compare the user's emotional state before a specific function is executed to the user's emotional state after the specific function is executed, and detect changes in the user's emotional state. For example, the emotion detector 120 may detect an emotional state for a predetermined time period before the "camera function" is executed, and also detect an emotional state for a predetermined time period after the "camera function" is executed. In this example, the emotion detector 120 may compare the detected emotional states to each other to detect changes between the emotional states. For example, if the user's emotional state before the "camera function" is executed is "depression" and the user's emotional state changes to "happiness" after the "camera function" is executed, the emotion detector 120 may detect "changes in emotional state" in that the user becomes happier when he or she uses the camera function.

The emotion detector 120 may score a plurality of emotion factors of an emotional model based on the information about the use state of the terminal in order to create emotion scores. The emotion detector 120 may then detect the user's emotional state based on the emotion scores. The emotional model may include a plurality of emotion factors used to express the user's emotional state. For example, the emotional model may be an OCC (Ortony-Clore-Collins) emotional model, an OCEAN (Openness-Conscientiousness-Extraversion-Agreeableness-Neuroticism) personality model, and the like. The example of the OCEAN personality model includes a plurality of emotion factors, such as Openness, Conscientiousness, Extraversion, Agreeableness, and Neuroticism.

If the OCEAN personality model is used, the emotion detector 120 may score the individual emotion factors of the OCEAN personality model based on the information about the use state of the terminal. For example, the emotion detector 120 may allocate an emotion score of "0.1" to Openness, "0.3" to Conscientiousness, "0.5" to Extraversion, "0.2" to Agreeableness, and "0.3" to Neuroticism, based on the information about the use state of the terminal. The emotion scores may be arbitrarily set by the user or by a manufacturer.

The emotion detector 120 may compare emotion scores before a specific function is executed with emotion scores after the specific function is executed, thereby scoring changes in the user's emotional state. For example, the emotion detector 120 may set difference values between emotion scores before a specific function is executed and emotion scores after the specific function is executed, as emotion score changes. As another non-limiting example, the emotion detector 120 may allocate weights to emotion scores before and after a specific function is executed, and then set difference values between the emotion scores before and after the specific function is executed, as changes in emotion scores. That is, it should be appreciated that the emotion detector 120 may score changes in the user's emotional state in various ways.

The mapping unit 130 may map the user's emotional state to the function based on the function execution state. For example, the mapping unit 130 may recognize that a "call function" is currently being executed based on the function execution state. The mapping unit 130 may map the user's emotional state before the "call function" is executed to the "call function". For example, if the user's emotional state before the "call function" is executed is "depression", the mapping unit 130 may map the user's emotional state of "depression" to the "call function".

As another example, the mapping unit 130 may recognize that the "call function" is terminated based on the function execution state. The mapping unit 130 may map an emotional state detected by the emotion detector 120 for a predetermined time period after the "call function" is terminated, to the "call function". For example, if the user's emotional state after he or she executes the "call function" is "happiness", the mapping unit 130 may map an emotional state of "happiness" to the "call function".

The mapping unit 130 may map an emotional state of the user to information included in one or more of the terminal's functions, based on the function execution state. For example, the mapping unit 130 may map an emotional state of the user to a collocutor that is included in a SNS function. As another example, the mapping unit 130 may map an emotional state of the user to a genre or singer that is included in the music play function. For example, the mapping unit 130 may map an emotional state "A" to a genre "B" or an emotional state "A" to a singer "C".

As such, the mapping unit 130 may extract a function that is currently being executed or has previously been executed, based on the function execution state, and map an emotional state of the user to the extracted function.

The mapping unit 130 may map the change in emotional state detected by the emotion detector 120 to the function. For example, if an emotional state of the user before the "camera function" is executed is "depression" and the emotional state of the user changes to "happiness" after the "camera function" is executed, the mapping unit 120 may map the change in emotional state of the user ("depression"->"happiness") to the "camera function".

The mapping unit 130 may map the emotion change score to the corresponding function and create, for example, a table, a matrix, or a vector including functions and changes in emotional state of the user mapped to the individual functions. For example, the mapping unit 130 may create a table, a matrix, or a vector, including mapped information ("emotion information") in the form of function-emotional state or function-change in emotional state of the user. Through such a table, a change in the user's emotional state according to each function may be easily recognized. Hereinafter, an example of the mapped information in the form of function-emotional state or function-change in emotional state may be referred to as emotion information.

The storage unit 140 may accumulate information mapped by the mapping unit 130 and store the accumulated information. For example, the storage unit 140 may be at least one recording medium from among a flash memory type, a hard disk type, a multimedia card micro type, a card type memory (for example, a SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like.

The emotion information generating apparatus 100 may be installed in a terminal. For example, the terminal may be a mobile phone, a smart phone, a notebook computer, a digital broadcasting terminal, a Personal Digital Assistants (PDA), a Portable Multimedia Player (PMP), a tablet, a home appliance, a video game, a navigation device, and the like. A user can execute various functions, such as a call function, a camera function, a TV viewing function, and an application execution function, using the terminal.

As described herein, the emotion information generating apparatus 100 may map the user's emotional state to the individual functions, thereby easily detecting at least one function corresponding to the user's emotional state.

Also, the emotion information generating apparatus 100 may recognize a change in the user's emotional state based on the user's emotional states before and after a specific function is executed, thereby easily detecting changes in the user's emotional state based on the execution of the function.

In addition, the emotion information generating apparatus 100 may more precisely recognize the user's emotional state and a change in the user's emotional state by scoring the user's emotional states using an emotional model to create emotion scores and recognizing the user's emotional state and the change in the user's emotional state based on the emotion scores.

FIGS. 2A and 2B illustrate an example of a process of mapping a user's emotional state to a function.

In the example of FIGS. 2A and 2B, it is assumed that the emotion information generating apparatus 100 detects a user's emotional state based on context used in messages from among information about the use state of a terminal. As another example, the emotion information generating apparatus 100 may detect the user's emotional state based on information about whether or not the user touches a display, the number of times that the user shakes the terminal, a degree of strength at which the user shakes the terminal, the number of times that the user clicks a specific icon or presses a specific keypad, and the like.

Referring to FIGS. 1 and 2A, the emotion information generating apparatus 100 may detect the user's emotional state based on context that is included in a message (for example, an SMS) currently being executed. The context included in the message may include information about the use state of a terminal 200.

As illustrated in (a) of FIG. 2A, the emotion information generating apparatus 100 may detect the user's emotional state as "happiness", based on the word "happy" 201 that is used in the SMS currently executed on the terminal 200.

As illustrated in (b) of FIG. 2A, the user may execute a "game function" 212 from among functions 211, 212, 213, and 214 that can be executed through the terminal 200.

Then, as illustrated in (c) of FIG. 2A, when the user terminates the "game function" 212, the emotion information generating apparatus 100 may detect the user's emotional state, based on context used in an SMS currently being executed, over a predetermined time period. For example, the emotion information generating apparatus 100 may detect the user's emotional state as "depression" after the "game function" 212 is executed, based on the word "depressed" 221 that is used in the SMS currently executed on the terminal 200.

Referring to FIGS. 1 and 2B, the emotion information generating apparatus 100 may compare the user's detected emotional state before the "game function" 212 is executed with the user's detected emotional state after the "game function" 212 is executed, thus detecting changes in the user's emotional state.

For example, if the emotion information generating apparatus 100 detects that the user's emotional state before the "game function" 212 is executed is "happiness" and the user's emotional state changes to "depression" after the "game function" 212 is executed, the emotion information generating apparatus 100 may detect "changes in emotional state" informing that the user becomes depressed when the user uses the game function 212.

By repeating the above-described process, the emotion information generating apparatus 100 may detect changes in emotional state of a user corresponding to the individual functions capable of being executed by the user.

In this example, the emotion information generating apparatus 100 may map the detected changes in emotional state of the user to the corresponding functions. For example, the emotion information generating apparatus 100 may create a table 230 including functions and changes in emotional state of the user mapped to the individual functions.

Accordingly, the emotion information generating apparatus 100 may more easily recognize a function corresponding to the user's emotional state by mapping the user's emotional states to the individual functions.

FIGS. 3A, 3B, and 3C illustrate another example of a process of mapping a user's emotional state to a function.

Referring to FIGS. 1 and 3A, the emotion information generating apparatus 100 may score a plurality of emotion factors of an emotional model based on information about the use state of a terminal 310 to create emotion scores. In the current example, it is assumed that the emotion information generating apparatus 100 creates emotion scores using the OCEAN personality model. However, it should be understood that the emotion information generating apparatus 100 may use any other emotional model than the OCEAN personality model.

In this example, the emotion information generating apparatus 100 determines scores for Openness, Conscientiousness, Extraversion, Agreeableness, and Neuroticism emotion factors of the OCEAN personality model, based on information about the use state of the terminal 310, to create emotion scores.

Referring to FIG. 1 and (a) of FIG. 3A, the emotion information generating apparatus 100 may create emotion scores corresponding to emotion factors that are based on information about the use state of the terminal 310. In this example, the emotion information generating apparatus 100 creates a first table 300 including emotion factors and emotion scores. The table 300 illustrates that an emotion score for Openness is 0.5, an emotion score for Conscientiousness is 0.1, an emotion score for Extraversion is 0.0, an emotion score for Agreeableness is 0.1, and an emotion score for Neuroticism is 0.0.

Referring to FIG. 1 and (b) of FIG. 3A, user X may execute a SNS function through the terminal 310, and have a conversation with person A through the SNS function.

Then, referring to FIG. 1 and (c) of FIG. 3A, when the user terminates the conversation with the person A, the emotion information generating apparatus 100 may determine a score for Openness, Conscientiousness, Extraversion, Agreeableness, and Neuroticism based on information about the use state of the terminal 310 over a predetermined time period, to create emotion scores. Then, the emotion information generating apparatus 100 may create a second table 320 including the emotion factors and the emotion scores.

Referring to FIG. 1 and (d) of FIG. 3A, user X starts a conversation with collocutor B through the SNS function.

Referring to FIG. 1 and (e) of FIG. 3A, when user X terminates the conversation with collocutor B, the emotion information generating apparatus 100 determines a score for Openness, Conscientiousness, Extraversion, Agreeableness, and Neuroticism based on information about the use state of the terminal 310 over a predetermined time period, to create emotion scores. Then, the emotion information generating apparatus 100 may create a third table 330 including the emotion factors and the emotion scores.

Referring to FIGS. 1 and 3B, the emotion information generating apparatus 100 may map an emotional state to at least one function of the terminal 310 (see FIG. 3A) and/or information included in the function, based on the function execution state. In the following example, it is assumed that the function is a "SNS function" and the information included in the SNS function is a "collocutor". The emotion information generating apparatus 100 may compare the emotion scores before the SNS function is executed with the emotion scores after the SNS function is executed, to score the changes in an emotional state of a user. For example, the emotion information generating apparatus 100 may set difference values between the emotion scores of the first table 300 and the emotion scores of the third table 330, as emotional change values, to create a fourth table 340.

Referring to FIGS. 1 and 3C, while the SNS function is being executed, the emotion information generating apparatus 100 may compare the user's emotion scores before he or she starts a conversion with a collocutor with the user's emotion scores after he or she terminates the conversation with the collocutor, thereby detecting changes in the user's emotional state. In this example, the emotion information generating apparatus 100 may detect changes in the user's emotional state according to the collocutor. For example, the emotion information generating apparatus 100 may compare emotion scores before the user starts a conversation with a collocutor A with emotion scores after the user terminates the conversation with the collocutor A, thereby scoring changes in emotional state. The emotion information generating apparatus 100 may set difference values between the emotion scores of the first table 300 and the emotion scores of the second table 320, as emotional change values.

The emotion information generating apparatus 100 may compare emotion scores before the user starts a conversation with the collocutor B with emotion scores after the user terminates the conversation with the collocutor B, thus scoring changes in emotional state. In this example, the emotion information generating apparatus 100 may set difference values between the emotion scores of the second table 320 and the emotion scores of the third table 330, as emotional change values.

The emotion information generating apparatus 100 may map the collocutors A and B to the emotional change values to create the results of the mapping as a fifth table 350.

In the current example, a process in which the emotion information generating apparatus 100 scores changes in emotional state according to a collocutor on a social network has been described. However, it should be appreciated that the apparatus 100 may score changes with respect to various information included in a function. For example, the emotion information generating apparatus 100 may detect changes in the user's emotional state based on information included in a specific function, such as changes in emotional state in response to political, financial, society, sports columns, and the like. As an example, changes in a user's emotional state may be based on stories posted on an Internet web site, such as changes in emotional state when a battle mode or a homerun-derby mode is executed during a baseball game, and the like.

As described in various examples herein, the emotion information generating apparatus 100 may recognize the user's emotional state or a change in the user's emotional state by scoring the user's emotional states using an emotional model to create emotion scores and recognizing the user's emotional state based on the emotion scores.

Figure 4:
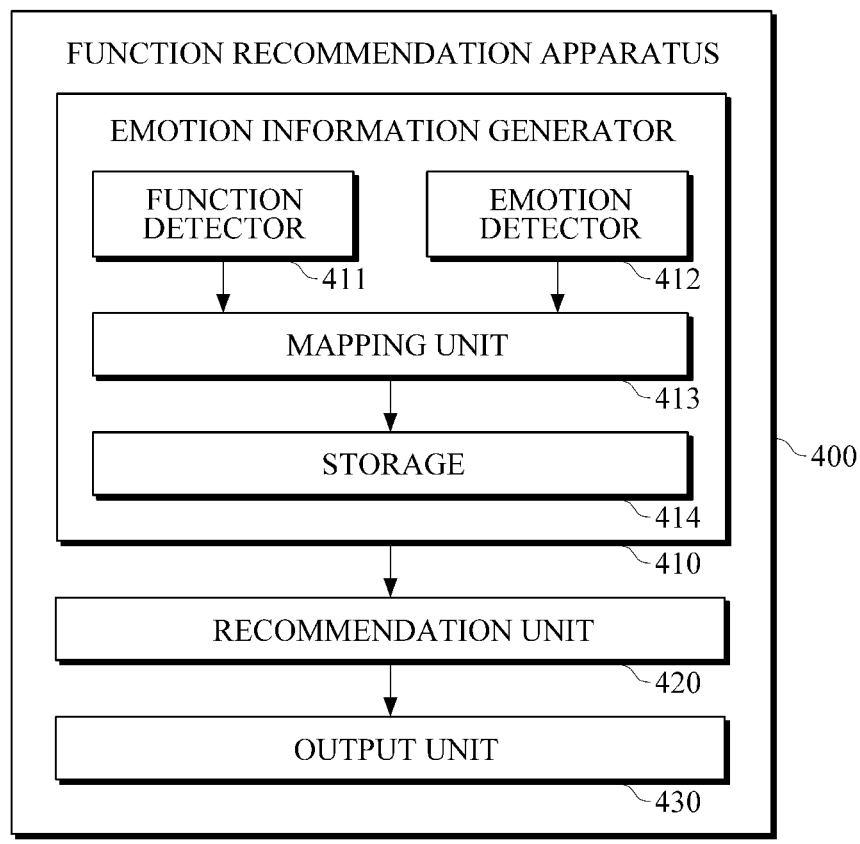
FIG. 4 is a diagram illustrating an example of a function recommendation apparatus based on emotion information.

FIG. 4 illustrates an example of a function recommendation apparatus based on emotion information.

Referring to FIG. 4, function recommendation apparatus 400 includes an emotion information generator 410, a recommendation unit 420, and an output unit 430. The function recommendation apparatus 400 may be included in terminal, for example, a mobile phone, a smart phone, a computer, a tablet, an appliance, a navigation device, a video game, and the like.

In this example, the emotion information generator 410 includes a function detector 411, an emotion detector 412, a mapping unit 413, and a storage unit 414. The function detector 411 may detect a function execution state of a terminal. The emotion detector 412 may detect a user's emotion state based on information about the use state of the terminal.

The mapping unit 413 may map the user's emotional state to a function based on the function execution state. The storage unit 414 may accumulate information mapped by the mapping unit 413 and store the accumulated information. Examples of the function detector 411, the emotion detector 412, the mapping unit 413, and the storage unit 414 have been described herein with reference to FIG. 1.

The recommendation unit 420 may recommend at least one function suitable to the user's emotional state based on the function-emotional state ("emotion information") mapped by the mapping unit 413 and/or the emotional state detected by the emotion detector 412.

The output unit 430 may generate an output such as a visual, acoustic, and/or tactile output. For example, the output unit 430 may be a display that displays information, an acoustic output module that can output audio data, a haptic module that can generate vibrations, and the like.

The recommendation unit 420 may recommend the at least one function to the user through the output unit 430.

As described herein, the function recommendation apparatus 400 may automatically recommend a function suitable to the user's emotional state, based on information that is obtained by mapping the user's emotional state and/or a change in the user's emotional state to a function.

Figure 5B:
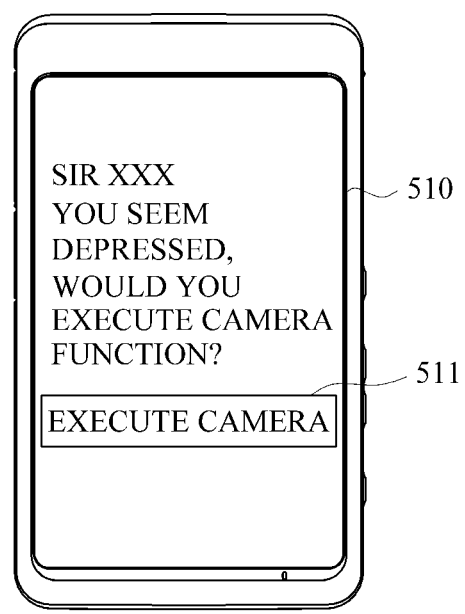

FIGS. 5A and 5B illustrate an example of a process for recommending a function to a user.

Referring to FIGS. 4 and 5A, the function recommendation apparatus 400 may create a table 500 including changes in emotional state in correspondence to functions.

Referring to FIGS. 4 and 5B, the function recommendation apparatus 400 may detect a user's emotional state based on information about the state of use of a terminal. If the user's current emotional state is "depression", the function recommendation apparatus 400 may recognize that the user's mood may change from "depression" to "happiness" if the user executes a "camera function", based on the table 500. Accordingly, the apparatus may recommend the user to execute the "camera function" through a display 510 of the terminal. For example, the function recommendation apparatus 400 may display a message for inducing the user's mood change and a directly executable icon 511 on the display 510. Accordingly, the user can execute the "camera function" by selecting the icon 511.

The current example relates to an example in which the function recommendation apparatus 400 recommends a function through the display 510. However, the function recommendation apparatus 400 may recommend a function through any other output unit besides the display 510 or in combination with the display 510.

As described herein, the function recommendation apparatus 400 may automatically recommend a function suitable to the user's emotional state based on information obtained by mapping the user's emotional state and/or a change in emotional state to a function.

Figure 6:
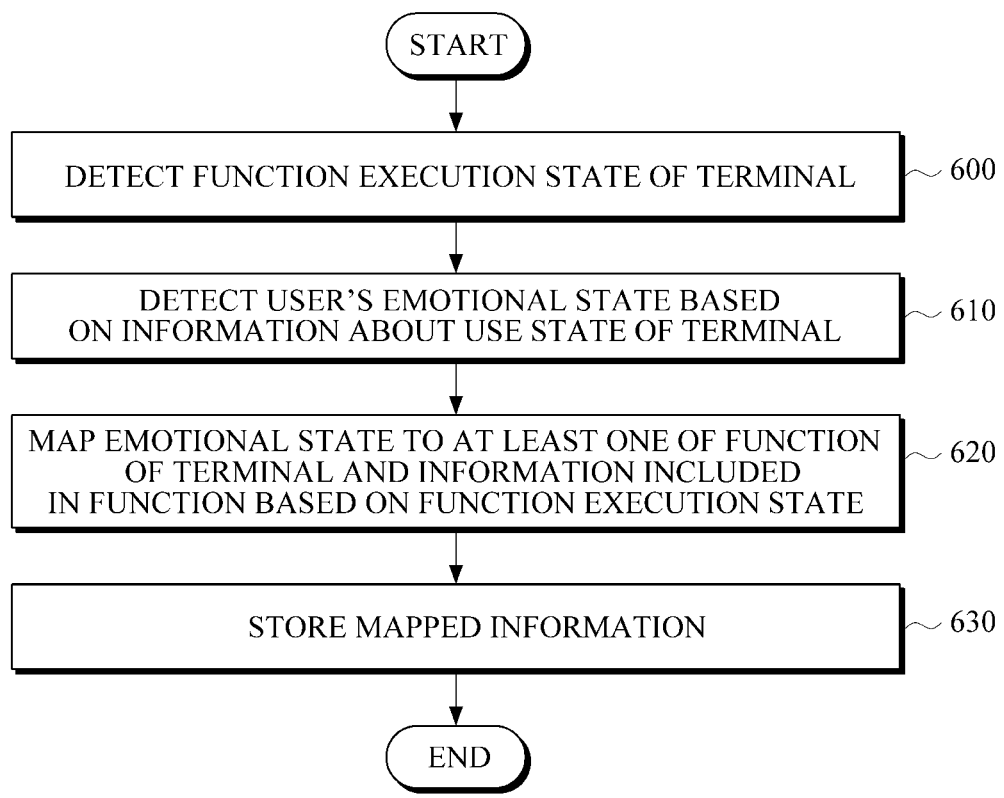
FIG. 6 is a flowchart illustrating an example of an emotion information generating method.

FIG. 6 illustrates an example of an emotion information generating method. For example, the method may be performed by the emotion information generating apparatus illustrated in FIG. 1.

Referring to FIG. 6, the emotion information generating apparatus detects a function execution state of a terminal (600).

Then, the emotion information generating apparatus detects a user's emotional state based on information about the use state of the terminal (610). For example, the apparatus may compare the user's emotional state before the function is executed with the user's emotional state after the function is executed, to detect changes in the user's emotional state. As another example, the emotion information generating apparatus may score a plurality of emotion factors of an emotion model based on the information about the use state of the terminal, to generate emotion scores, and detect the user's emotional state based on the emotion scores. In this example, the emotion information generating apparatus may compare an emotion score before the function is executed with an emotion score after the function is executed to score a change in the user's emotional state.

The emotion information generating apparatus maps the user's emotional state to a function based on the function execution state (620). For example, the emotion information generating apparatus may map the scored change in the user's emotional state to the corresponding function, and create a table, a matrix, a vector, and the like, that includes functions and changes in emotional state mapped to the functions. The emotion information generating apparatus may extract a function that is currently being executed or previously executed, based on the function execution state, and map the user's emotional state to the extracted function.

The emotion information generating apparatus stores the mapped information ("emotion information") in a storage unit (630). In this example, the emotion information generating method may detect a function corresponding to the user's emotional state by mapping the user's emotional states to individual functions.

Also, the emotion information generating apparatus may detect changes in the user's emotional state according to execution of a function by recognizing the change in the user's emotional state, based on the user's emotional states before and after the function is executed.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An emotion information generating apparatus comprising:
    a processor;
    a function detector configured to detect an execution state of a first function of a plurality of functions executed by a terminal;
    an emotion detector configured to
        detect an interaction of a user with the terminal while the first function is being executed, and
        convert the detected interaction into emotional data comprising an emotional state of the user of the terminal;
    a mapping unit configured to map the emotional state of the user to at least one of the first function executed by the terminal and information included in the first function executed by the terminal;
    a storage unit configured to store the first function in association with the mapped emotional state of the user,
    wherein the storage unit additionally stores each of the plurality of functions executed by the terminal in association with a corresponding emotional state of the user mapped to each of the plurality of functions; and
    an output device configured to visually, acoustically, or tactually output a function recommendation based on the emotional state.

2. The emotion information generating apparatus of claim 1, wherein the emotion detector is configured to compare a first emotional state of the user before the first function is executed with a second emotional state of the user after the first function is executed, to detect a change in the emotional state of the user.

3. The emotion information generating apparatus of claim 1, wherein the emotion detector is configured to score a plurality of emotion factors of an emotional model to create a plurality of emotion scores, and to determine the emotional state of the user based on the emotion scores.

4. The emotion information generating apparatus of claim 3, wherein the emotion detector is configured to compare first emotion scores before the first function is executed with second emotion scores after the first function is executed, to score a change in the emotion scores.

5. The emotion information generating apparatus of claim 4, wherein the mapping unit is configured to map the change in the emotion scores to the first function, and create a table, a matrix, or a vector, including the first function and the change in emotion scores mapped to the first function.

6. The emotion information generating apparatus of claim 1, wherein the first function is a function that is currently being executed or that was previously executed.

7. The emotion information generating apparatus of claim 1, wherein the emotion detector is configured to determine the emotional state of the user with a stochastic score.

8. The emotion information generating apparatus of claim 1, wherein the execution state of the first function comprises at least one of information about an execution start time of the first function, an execution termination time of the first function, and whether or not the first function is currently being executed.

9. A function recommendation apparatus using emotion information, the function recommendation apparatus comprising:
    a processor;
    an emotion information generating unit configured to map a first emotional state of a user of a terminal to at least one of a first function of a plurality of functions executed by the terminal and information included in the first function executed by the terminal;
    a storage unit configured to store the first function in association with the first emotional state of the user and to additionally store each of the plurality of functions executed by the terminal in association with a corresponding emotional state of the user mapped to each of the plurality of functions;
a recommendation unit configured to recommend at least one function from among the plurality of stored functions to the user based on the first emotional state of the user and the stored corresponding emotional states; and
an output device configured to visually, acoustically, or tactually output the at least one recommended function to the user.

10. The function recommendation apparatus of claim 9, wherein the emotion information generating unit comprises:
a function detector configured to detect an execution state of the first function;
an emotion detector configured to determine the first emotional state of the user of the terminal based on an interaction of the user with the terminal while the first function is being executed; and
a mapping unit configured to map the first emotional state of the user to at least one of the first function executed by the terminal and the information included in the first function executed by the terminal.

11. The function recommendation apparatus of claim 10, wherein the execution state of the first function comprises at least one of information about an execution start time of the first function, an execution termination time of the first function, and whether or not the first function is currently being executed.

12. The function recommendation apparatus of claim 9, wherein the emotion information generating unit is configured to compare an initial emotional state of the user before the first function is executed with a second emotional state of the user after the first function is executed, to detect a change in the first emotional state of the user.

13. The function recommendation apparatus of claim 10, wherein the emotion information generating unit is configured to score a plurality of emotion factors of an emotional model based on the interaction of the user with the terminal, to create a plurality of emotion scores, and to detect the first emotional state of the user based on the emotion scores.

14. The function recommendation apparatus of claim 13, wherein the emotion information generating unit is configured to compare first emotion scores before the first function is executed with second emotion scores after the first function is executed, and to score a change in the emotion scores.

15. The function recommendation apparatus of claim 9, wherein the recommendation unit is configured to recommend the at least one function to the user through an output unit.

16. The function recommendation apparatus of claim 9, wherein the emotion information generating unit is configured to detect the first emotional state of the user with a stochastic score.

17. An emotion information generating method comprising:
detecting an execution state of a first function of a plurality of functions executed by a terminal;
detecting an interaction of a user with the terminal while the first function is being executed;
converting the detected interaction into emotional data comprising an emotional state of the user of the terminal;
mapping the emotional state of the user to at least one of the first function executed by the terminal and information included in the first function executed by the terminal;
storing the first function in association with the mapped emotional state of the user;
storing each of the plurality of functions in association with a corresponding emotional state of the user mapped to each of the plurality of functions; and
visually, acoustically, or tactually outputting a function recommendation based on the emotional state.

18. The emotion information generating method of claim 17, wherein the determining of the emotional state of the user comprises comparing a first emotional state of the user before the first function is executed with a second emotional state of the user after the first function is executed, and detecting a change in the emotional state of the user.

19. The emotion information generating method of claim 17, wherein the determining of the emotional state of the user comprises scoring a plurality of emotion factors of an emotional model to create a plurality of emotion scores, and determining the emotional state of the user based on the emotion scores.

20. The emotion information generating method of claim 19, wherein the determining of the emotional state of the user comprises comparing first emotion scores before the first function is executed with second emotion scores after the first function is executed, and scoring a change in the emotion scores.

21. The emotion information generating method of claim 20, wherein the mapping of the emotional state of the user comprises mapping the change in the emotion scores to the first function, and creating a table, a matrix, or a vector, including the first function and the change in the emotion scores mapped to the first function.

22. The emotion information generating method of claim 17, wherein the first function is a function that is currently executed or that was previously executed.

23. The emotion information generating method of claim 17, wherein the determining of the emotional state of the user comprises determining the emotional state of the user with a stochastic score.

24. The emotion information generating method of claim 17, wherein the execution state of the first function comprises at least one of information about an execution start time of the first function, an execution termination time of the first function, and whether or not the first function is currently being executed.

* * * * *